US008248768B2

(12) United States Patent  
Shen

(10) Patent No.: US 8,248,768 B2  
(45) Date of Patent: Aug. 21, 2012

(54) ELECTRONIC DEVICE HAVING SLIDABLE COVER

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 214 days.

(21) Appl. No.: 12/837,481

(22) Filed: Jul. 15, 2010

(65) Prior Publication Data

US 2011/0273822 A1    Nov. 10, 2011

(30) Foreign Application Priority Data

May 6, 2010 (TW) .............................. 99208371 U

(51) Int. Cl.
*H05K 7/12* (2006.01)

(52) U.S. Cl. ................. 361/679.01; 361/727; 455/575.4

(58) Field of Classification Search .......... 361/724–727, 361/679.01–679.61, 679.55, 679.56, 679.57, 361/679.58; 455/575.1–575.4; 379/433.11–433.13
See application file for complete search history.

(56) References Cited

U.S. PATENT DOCUMENTS

| 6,615,993 B1 * | 9/2003 | Rudiger ......................... 211/26 |
| 7,218,509 B2 * | 5/2007 | Liao et al. ..................... 455/347 |
| 8,019,398 B2 * | 9/2011 | Wang ......................... 455/575.4 |

* cited by examiner

*Primary Examiner* — Jinhee Lee  
*Assistant Examiner* — Ingrid Wright  
(74) *Attorney, Agent, or Firm* — Altis Law Group, Inc.

(57) ABSTRACT

An electronic device includes a bracket, a cover, a first sliding member, a second sliding member fixed to the cover, a resilient member positioned between the first and second sliding members, and fasteners. Each fastener includes an engaging portion and a hooking portion. The fasteners extend through the bracket and the first sliding member, to limit the first sliding member and the bracket between the engaging portions and the hooking portions.

6 Claims, 7 Drawing Sheets

ELECTRONIC DEVICE HAVING SLIDABLE COVER

BACKGROUND

1. Technical Field

The present disclosure relates to electronic devices and, particularly to an electronic device with a slidable cover.

2. Description of Related Art

Often, electronic devices, such as digital cameras, have a separate cover for covering, for example, a camera lens or other important parts, to prevent damage. However, in use, separate covers are easily lost.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying, is illustrated by way of examples and not by way of limitation. It should be noted that references to "an" or "one" embodiment in this disclosure are not necessarily to the same embodiment, and such references mean at least one.

Figure 1:
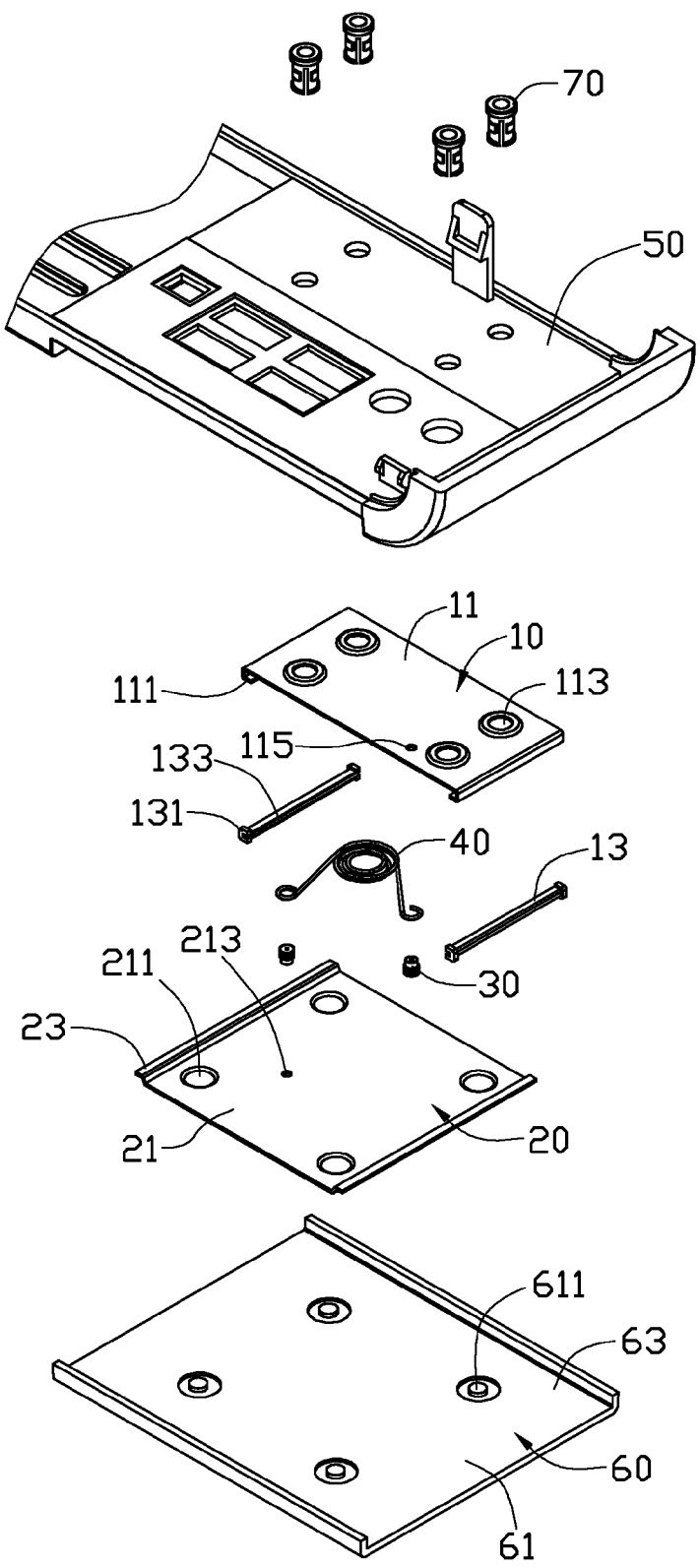
FIG. 1 is an exploded, isometric view of an embodiment of an electronic device, the electronic device includes a first sliding member, a second sliding member, a resilient member, a plurality of fasteners, a cover, and a bracket.
Figure 2:
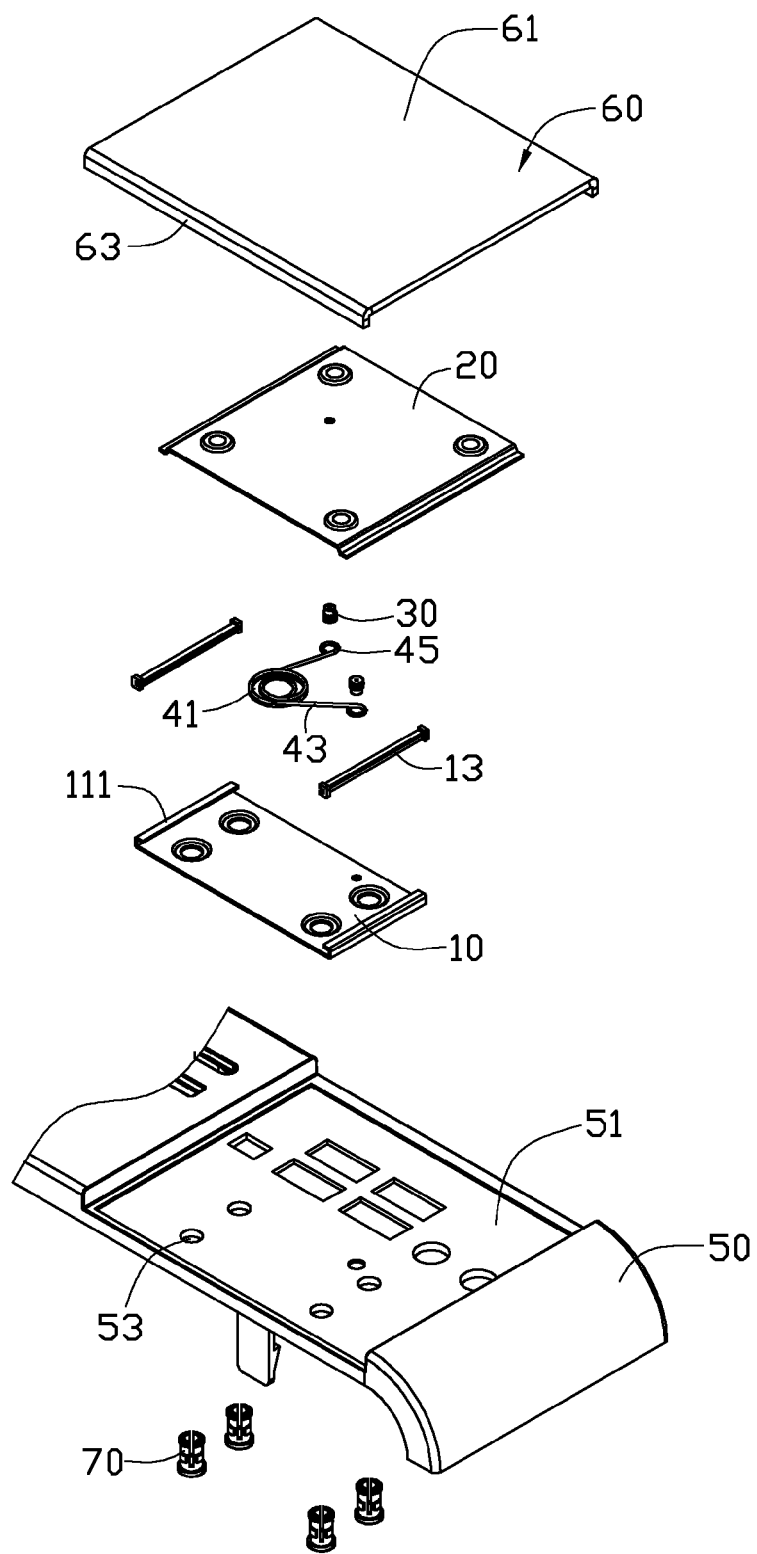
FIG. 2 is an inverted view of FIG. 1.

Referring to FIGS. 1 and 2, one embodiment of an electronic device includes a first sliding member 10, a second sliding member 20, two mounting members 30, a resilient member 40, a bracket 50, a cover 60, and a plurality of fasteners 70. In this embodiment, the mounting members 30 are rivets.

The bracket 50 is a panel of an electronic device, such as a digital camera, and defines a rectangular receiving space 51 for slidably receiving the cover 60. The bottom of the receiving space 51 defines a plurality of through holes 53.

The cover 60 is substantially U-shaped, and includes a top wall 61 and two sidewalls 63 extending down from opposite sides of the top wall 61. A plurality of rivet columns 611 extends perpendicularly down from the top wall 61.

The first sliding member 10 includes a main body 11 and two sliding portions 13 mounted to opposite ends of the main body 11. The main body 11 may be plate shaped, two opposite ends of which are bent to form a receiving portion 111, which has a substantially C-shaped cross-section. The main body 11 defines a plurality of locking holes 113 and a mounting hole 115. The sliding portions 13 are substantially bar-shaped. Each end of each sliding portion 13 forms a limiting block 131. Each of the sliding portions 13 defines a channel 133 along a longitudinal direction of the sliding portion 13. Each of the sliding portions 13 is mounted in a corresponding receiving portion 111. The limiting blocks 131 of each of the sliding portions 13 resist against two opposite ends of the corresponding receiving portion 111, to sandwich the receiving portion 111.

The second sliding member 20 may be plate shaped, and includes a main plate 21 and two substantially parallel sliding rails 23 formed at two opposite sides of the second sliding member 20. The main plate 21 defines a plurality of riveting holes 211 and a fixing hole 213.

The resilient member 40 is a torsion spring and includes a coil portion 41 at a middle portion and two feet extending from opposite ends of the coil portion 41 respectively. Each foot includes a pole 43 and a substantially C-shaped clip 45 formed at a distal end of the pole 43.

Figure 3:
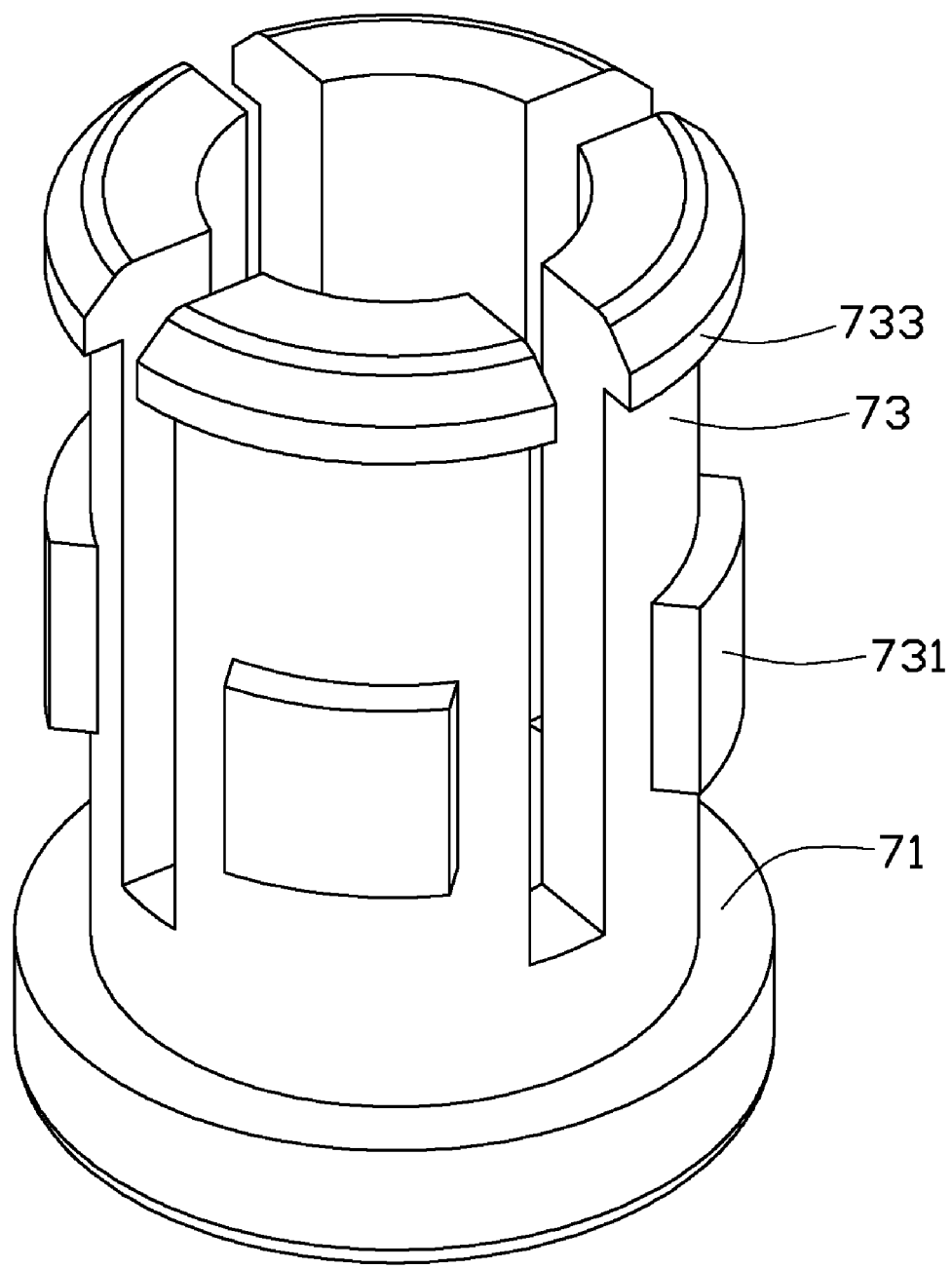
FIG. 3 is an enlarged, isometric view of one of the fasteners of FIG. 2.

Referring to FIG. 3, each fastener 70 includes a bottom portion 71 and a plurality of arc-shaped locking portions 73 extending up perpendicularly from the bottom portion 71. The locking portions 73 of each fastener 70 together substantially form a column shape. Each locking portion 73 includes an engaging portion 731 formed at a middle portion of the outer surface of the locking portion 73 and a hooking portion 733 formed at the outer surface of a distal end of the locking portion 73.

Figure 4:
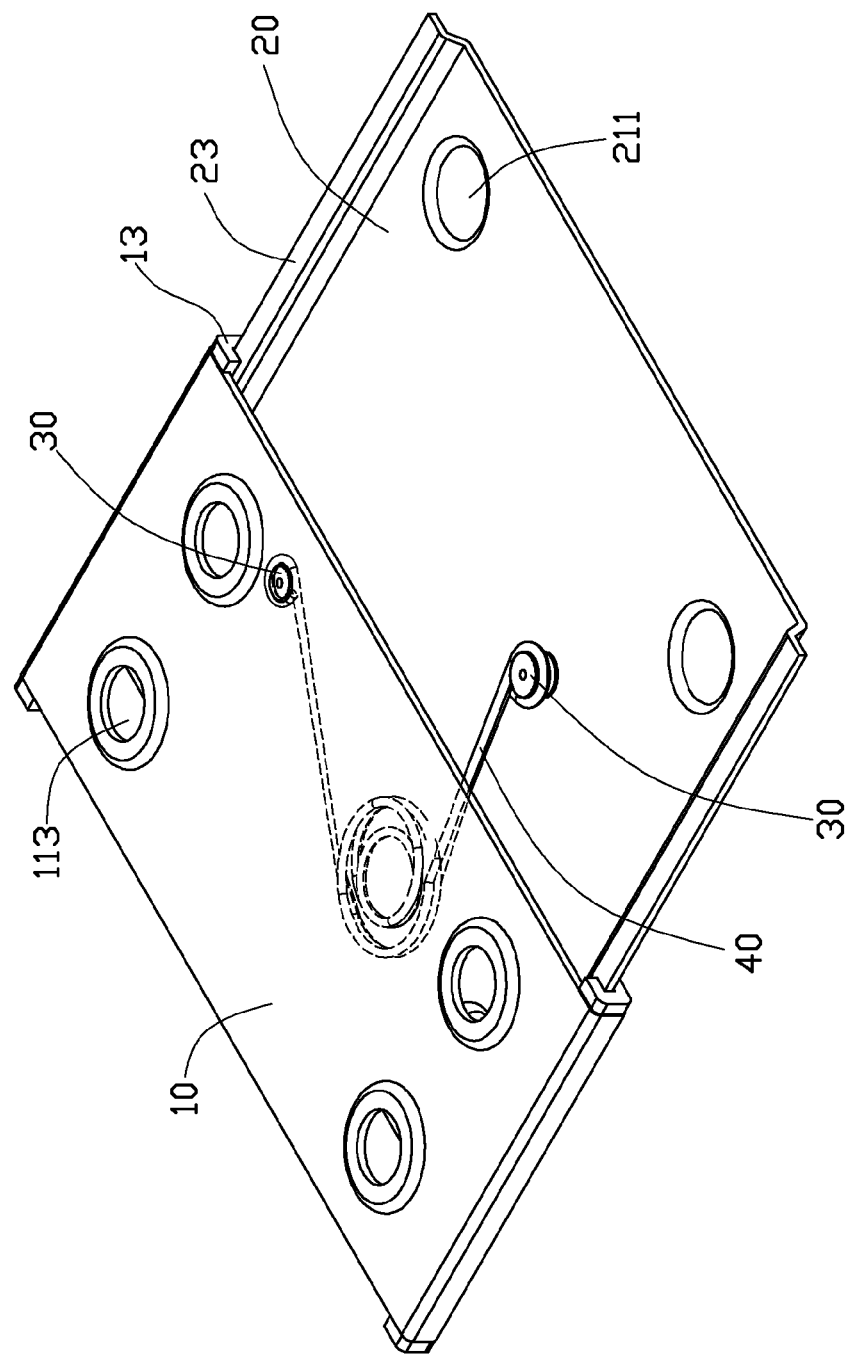
FIG. 4 is an assembled, isometric view of the first sliding member, the second sliding member, and the resilient member of FIG. 1.

Referring to FIG. 4, in assembly, the sliding portions 13 are mounted in the corresponding receiving portions 111 of the first sliding member 10. The sliding rails 23 of the second sliding member 20 are slidably received in the corresponding channels 133 of the sliding portions 13. The mounting members 30 are respectively fixed to the mounting hole 115 of the first sliding member 10 and the fixing hole 213 of the second sliding member 20. The resilient member 40 is received between the first sliding member 10 and the second sliding member 20, with the clips 45 of the resilient member 40 sleeved around the corresponding mounting members 30.

Figure 5:
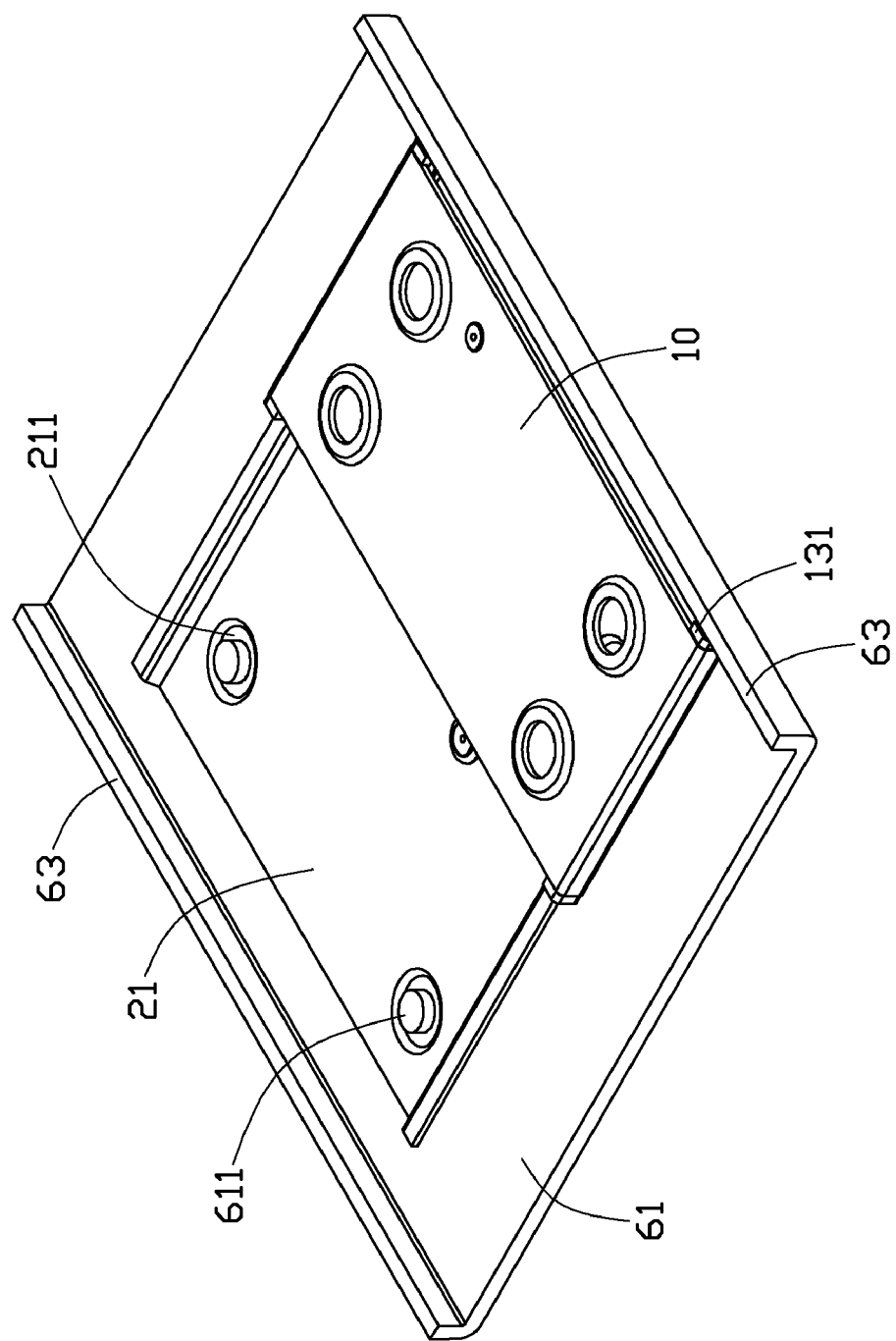
FIG. 5 an assembled, isometric view of the first sliding member, the second sliding member, the resilient member, and the bracket of FIG. 1.
Figure 6:
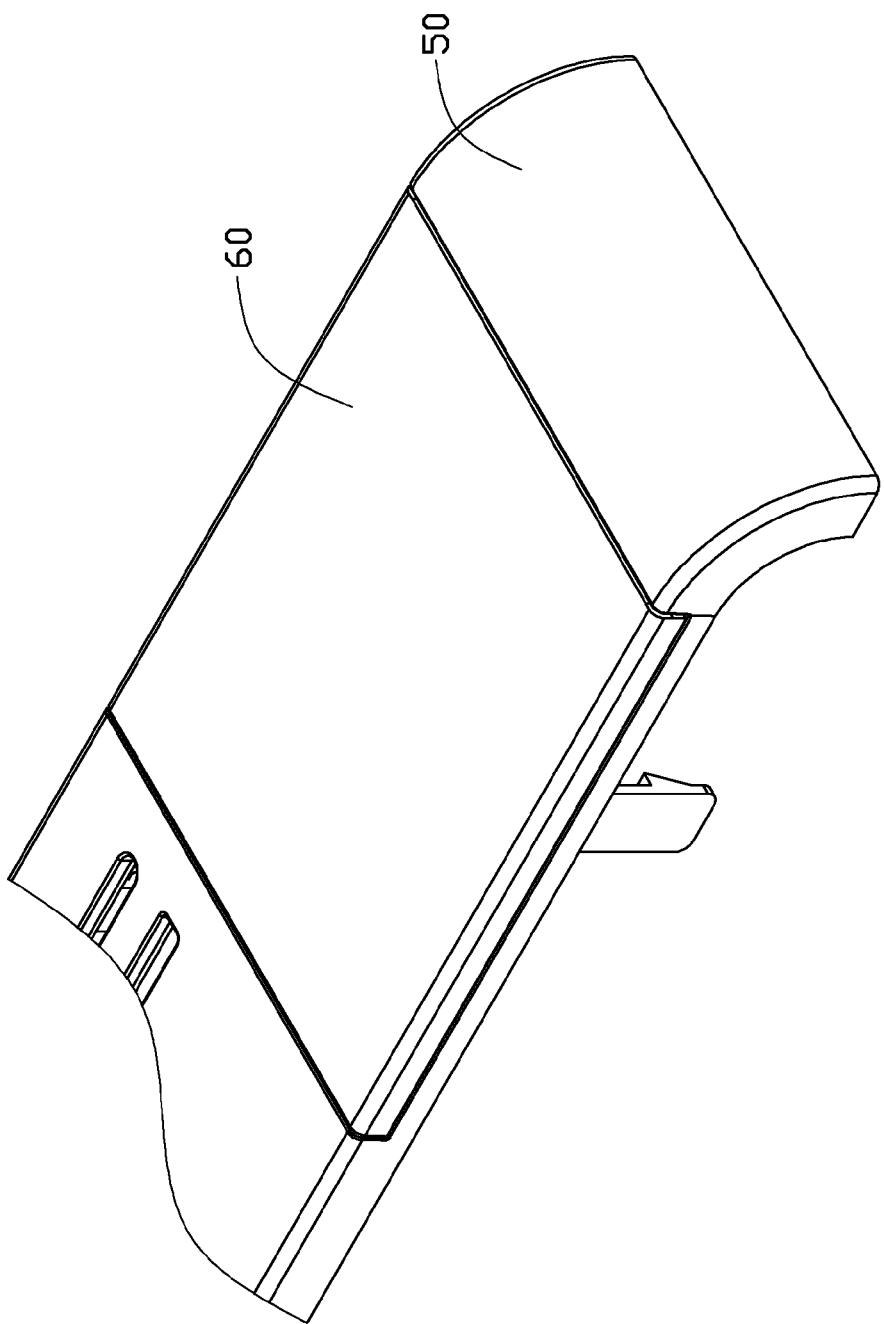
FIG. 6 is a partial, assembled, isometric view of the electronic device of FIG. 1.

Referring to FIG. 5 and FIG. 6, the rivet columns 611 of the cover 60 extend through the riveting holes 211 of the second sliding member 20 to be riveted in the riveting holes 211, respectively, to fix the second sliding member 20 to the cover 60. In this embodiment, the rivet columns 611 of the cover 60 are made of hot-melt plastic, which can be heated then riveted in the riveting holes 211 of the second sliding member 20.

The cover 60 together with the first and second sliding members 10 and 20 are received in the receiving space 51 of the bracket 50. The locking portions 73 of each fastener 70 are compressed to extend through the corresponding through hole 53 of the bracket 50 and the corresponding locking hole 113 of the first sliding member 10. The locking portions 73 of each fastener 70 restore to limit position of the first sliding member 10 and the bracket 50 to be between the engaging portions 731 and the hooking portions 733. The cover 60 covers the first sliding member 10 and the second sliding member 20 in the receiving space 51 of the bracket 50. One sidewall 63 of the cover 60 can engage with the limiting block 131 of the first sliding member 10 to limit movement of the cover 60, as shown in FIG. 5.

Figure 7:
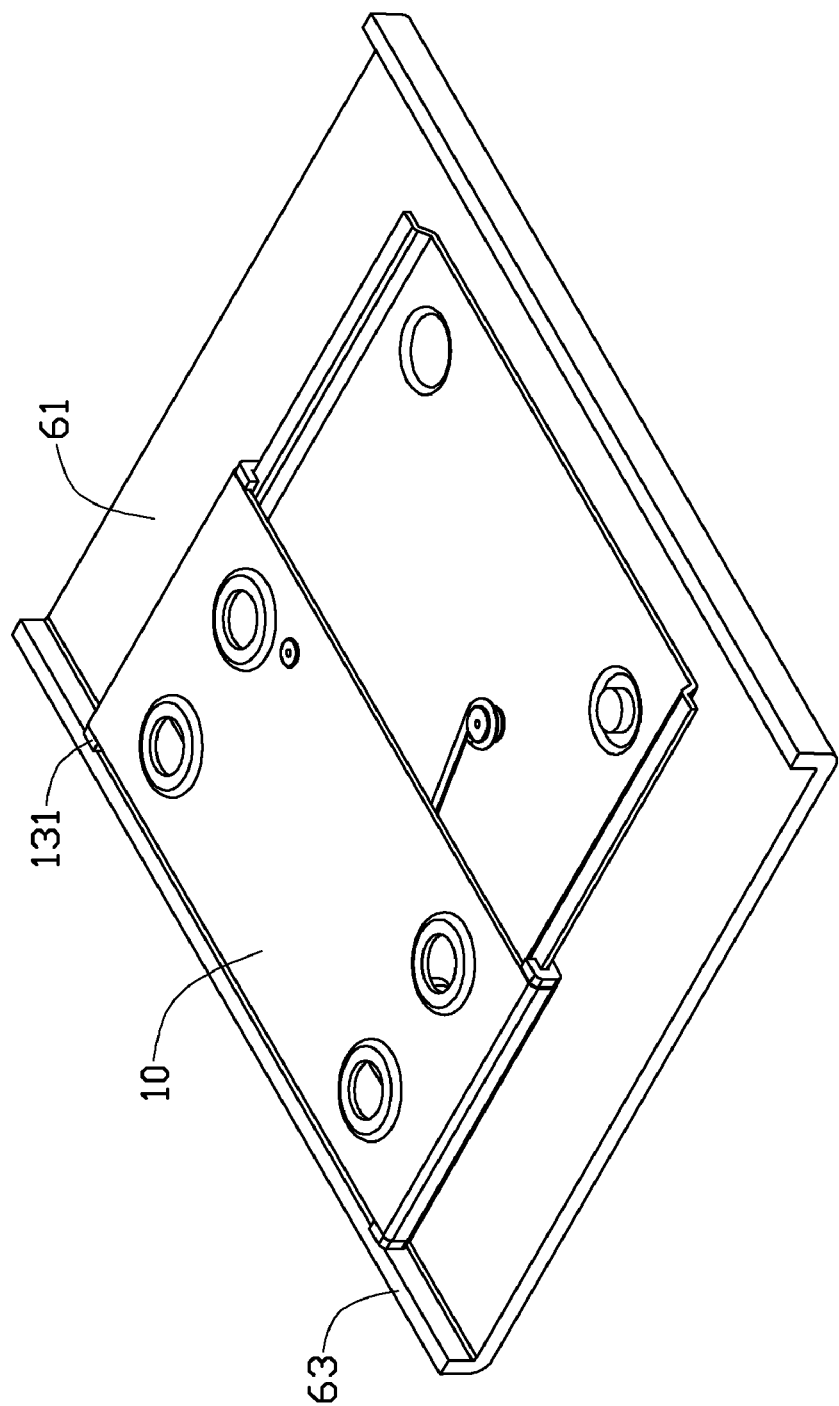
FIG. 7 is similar to FIG. 5, but showing a different state.

While sliding the cover 60 relative to the bracket 50, the cover 60 drives the second sliding member 10 to slide relative to the first sliding member 10, until the other sidewall 63 of the cover 60 engages with the limiting block 131 of the other side of the first sliding member 10, to limit movement of the cover 60, as shown in FIG. 7.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device, comprising:
   a bracket defining a plurality of through holes;
   a cover forming a plurality of rivet columns;
   a first sliding member defining a plurality of locking holes;
   a second sliding member defining a plurality of riveting holes, wherein the rivet columns of the cover engage in and are riveted with the riveting holes of the second sliding member;
   a resilient member positioned between the first and second sliding members, with two opposite ends of the resilient member respectively fixed to the first and second sliding members; and
   a plurality of fasteners, wherein each fastener comprises a bottom portion and a plurality of locking portions extending perpendicularly from the bottom portion, each locking portion comprises an engaging portion formed from an outer surface of the locking portion and a hooking portion formed from a distal end of the outer surface of the locking portion;
   wherein the locking portions of each fastener extend through a corresponding one of the through holes of the bracket and a corresponding one of the corresponding locking holes of the first sliding member, to limit the first sliding member and the bracket between the engaging portions and the hooking portions.

2. The electronic device of claim 1, wherein the bracket defines a rectangular receiving space, the cover covers the first and second sliding members in the receiving space.

3. The electronic device of claim 1, wherein the locking portions of each of the fasteners together substantially form a column shape.

4. The electronic device of claim 1, wherein the first sliding member comprises a main body and two sliding portions mounted to opposite ends of the main body, each sliding portion forms two limiting blocks at opposite ends of each sliding portion, the cover forms two sidewalls at opposite sides of the cover, the limiting blocks engage with the sidewalls to limit movement of the cover.

5. The electronic device of claim 1, wherein the resilient member is a coil spring.

6. The electronic device of claim 1, wherein the rivet columns of the cover are made of hot-melt plastic.

* * * * *